(12) United States Patent
Matsuzaki

(10) Patent No.: US 7,933,941 B2
(45) Date of Patent: Apr. 26, 2011

(54) ARITHMETIC PROGRAM CONVERSION APPARATUS, ARITHMETIC PROGRAM CONVERSION PROGRAM AND ARITHMETIC PROGRAM CONVERSION METHOD

(75) Inventor: Kazuhiro Matsuzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1212 days.

(21) Appl. No.: 11/589,932

(22) Filed: Oct. 31, 2006

(65) Prior Publication Data

US 2008/0040409 A1 Feb. 14, 2008

(30) Foreign Application Priority Data

Jul. 31, 2006 (JP) ................. 2006-207905

(51) Int. Cl.
*G06F 7/00* (2006.01)
*G06F 15/00* (2006.01)
*G06F 9/45* (2006.01)
(52) U.S. Cl. ......... 708/204; 708/496; 717/136; 717/140
(58) Field of Classification Search .............. 708/204, 708/495–498, 550–553; 703/13–15, 22
See application file for complete search history.

(56) References Cited

U.S. PATENT DOCUMENTS

| | | | |
|---|---|---|---|
| 6,256,776 B1 * | 7/2001 | Melanson | 717/124 |
| 6,460,177 B1 | 10/2002 | Lee | |
| 7,110,927 B1 * | 9/2006 | San et al. | 703/13 |
| 2002/0059354 A1 | 5/2002 | Uchida | |

FOREIGN PATENT DOCUMENTS

| | | |
|---|---|---|
| JP | 07-325710 | 12/1995 |
| JP | 2001-101012 | 4/2001 |
| JP | 2002-149397 | 5/2002 |

OTHER PUBLICATIONS

S. Kim, K.-I. Kum, and W. Sung, "Fixed-point optimization utility for C and C++ based digital signal processing programs", IEEE Trans. Circuits Syst. II, vol. 45, pp. 1455-1464, 1998.*

(Continued)

*Primary Examiner* — Lewis A Bullock, Jr.
*Assistant Examiner* — Matthew Sandifer
(74) *Attorney, Agent, or Firm* — Fujitsu Patent Center

(57) ABSTRACT

An arithmetic program conversion apparatus, an arithmetic program conversion program and an arithmetic program conversion method that can convert the floating-point arithmetic of an arithmetic program into a fixed-point arithmetic without degrading the accuracy. The apparatus comprises a profile section that uses as object variables the floating-point type variables of an arithmetic program for performing floating-point arithmetic operations, alters the arithmetic program so as to output the changes in the values of the object variables as history at the time of executing the arithmetic program in order to provide a first program, executes the first program and detects the range of value of the object variables according to the history obtained as a result of the execution and a conversion section that alters the arithmetic program according to the ranges of value of the object variables as detected by the profile section so as to convert the object variables into fixed-point type variables in order to provide a second program, executes the second program and determines if the accuracy of the outcome of the execution of the second program meets the predefined and required accuracy level or not.

18 Claims, 7 Drawing Sheets

OTHER PUBLICATIONS

W. Sung and K.-I. Kum, "Simulation-based word-length optimization method for fixed-point digital signal processing systems", IEEE Trans. Signal Processing, vol. 43, pp. 3087-3090, 1995.*

K.-I. Kum, J. Kang, and W. Sung, "Autoscaler for C: an optimizing floating-point to integer C program converter for fixed-point digital signal processors", IEEE Transactions on Circuits and Systems II: Analog and Digital Signal Processing, vol. 47, issue 9, pp. 840-848, 2000.*

Sanghamitra Roy and Prith Banerjee, "An algorithm for trading off quantization error with hardware resources for MATLAB-based FPGA design," IEEE Transactions on Computers, vol. 54, No. 7, pp. 886-896, Jul. 2005.*

Andrea G. M. Cilio and Henk Corporaal, "Floating Point to Fixed Point Conversion of C Code," Delft University of Technology, Computer Architecture and Digital Techniques Dept, 1997.*

* cited by examiner

FIG. 7

| INPUT PARAMETER VALUE OF P1 | 1 | 5 | 10 | 15 | 20 |
|---|---|---|---|---|---|
| OBJECT VARIABLE RANGE OF VALUE OF X [n] | 0.01 ~ 1.00 | 0.05 ~ 5.00 | 0.1 ~ 10.0 | 0.15 ~ 15.0 | 0.2 ~ 20.00 |

ARITHMETIC PROGRAM CONVERSION APPARATUS, ARITHMETIC PROGRAM CONVERSION PROGRAM AND ARITHMETIC PROGRAM CONVERSION METHOD

BACKGROUND OF THE INVENTION

1. Field of the Invention

This invention relates to an arithmetic program conversion apparatus, an arithmetic program conversion program and an arithmetic program conversion method for converting the type of variable of an arithmetic program.

2. Description of the Related Art

Floating-point arithmetic is being popularly used in application programs relating to signal processing (for mobile communications, image processing, etc.) to examine and verify systems. In conventional hardware design operations, designers are forced to manually convert a reference of a C program of a fixed floating-point model, for which system verification has been made, into integer arithmetic with a fixed bit width in the HDL (hardware description language).

In recent years, the RTL (register transfer level) automatic synthesis technology (high order synthesis technology) using a C program of a fixed floating-point model has been put to practical use. As for fixed-point arithmetic, fixed-point class libraries have become commercially available so that a good environment has been established for simulations.

Fixed floating-point data generation circuits are known as conventional techniques that relates to the present invention (see, inter alia, Patent Document 1: Jpn. Pat. Appln. Laid-Open Publication No. 2002-149397). Such known fixed-point data generation circuits are adapted to detect the largest value of the exponential parts of a plurality of floating-point data and determine the difference between the largest value and the exponential part of the input floating-point data.

However, the conversion from a floating-point arithmetic to a fixed-point arithmetic has to be done manually. Therefore, it is increasingly difficult to make such conversions to a low cost (small bit width) fixed-point arithmetic, while maintaining the required accuracy level (S/N ratio), as the level of functional sophistication rises.

SUMMARY OF THE INVENTION

In view of the above-identified circumstances, it is therefore an object of the present invention to provide an arithmetic program conversion apparatus, an arithmetic program conversion program and an arithmetic program conversion method that can convert the floating-point arithmetic of an arithmetic program into a fixed-point arithmetic without degrading the accuracy.

In an aspect of the present invention, the above object is achieved by providing an arithmetic program conversion apparatus for converting the type of variable of an arithmetic program, the apparatus comprising: a profile section that uses as object variables floating-point type variables of an arithmetic program for performing floating-point arithmetic operations, alters the arithmetic program so as to output the changes in the values of the object variables as history at the time of executing the arithmetic program in order to provide a first program, executes the first program and detects the range of value of the object variables according to the history obtained as a result of the execution; and a conversion section that alters the arithmetic program according to the ranges of value of the object variables as detected by the profile section so as to convert the object variables into fixed-point type variables in order to provide a second program, executes the second program and determines if the accuracy of the outcome of the execution of the second program meets the predefined and required accuracy level or not.

Preferably, in an arithmetic program conversion apparatus according to the present invention, when the conversion section determines that the accuracy of the outcome of the execution of the second program does not meet the predefined and required accuracy level, it alters the second program so as to expand the predetermined bit widths of the object variables, subsequently executes the second program and determines if the accuracy of the outcome of the execution of the second program meets the predefined and required accuracy level or not.

Preferably, in an arithmetic program conversion apparatus according to the present invention, when the conversion section determines that the accuracy of the outcome of the execution of the second program meets the predefined and required accuracy level, it alters the second program so as to reduce the predetermined bit widths of the object variables, subsequently executes the second program and, when it determines that the accuracy of the outcome of the execution of the second program meets the predefined and required accuracy level, it outputs the second program.

Preferably, in an arithmetic program conversion apparatus according to the present invention, when the conversion section determines that the accuracy of the outcome of the execution of the second program does not meet the predefined and required accuracy level, it alters the second program so as to expand the predetermined bit widths of the object variables, subsequently executes the second program and repeats the expansion of the bit widths of the predetermined object variables, the alteration of the second program and the execution of the second program until the outcome of the execution of the second program meets the predefined and required accuracy level.

Preferably, in an arithmetic program conversion apparatus according to the present invention, the conversion section alters the second program so as to change the predetermined bit widths of the object variables in each stage of an arithmetic unit of the second program, executes the second program and outputs the second program when it determines that the accuracy of the outcome of the execution of the second program meets the predefined and required accuracy level and that the magnitude of the entire operation of the second program is reduced as a result of the change in the bit width.

Preferably, in an arithmetic program conversion apparatus according to the present invention, the profile section executes the first program for each value of parameters that the arithmetic program uses and detects the range of value for each object variable, merging the histories of the values of the parameters.

Preferably, in an arithmetic program conversion apparatus according to the present invention, the conversion section computationally determines the accuracy level according to the outcome of the execution of the first program and the outcome of the execution of the second program.

Preferably, in an arithmetic program conversion apparatus according to the present invention, the profile section executes the first program for each range of value of parameters that the arithmetic program uses and detects the ranges of value of the object variables for each range of value of the parameters and the conversion section alters the arithmetic program so as to add the bit shifts of the object variables according to the ranges of value of the object variables for each range of value of the parameters to the arithmetic program in order to provide the second program.

Preferably, in an arithmetic program conversion apparatus according to the present invention, the profile section specifies the variables of the part to be turned into hardware of the arithmetic program as object variable.

In another aspect of the present invention, there is provided an arithmetic program conversion program for causing a computer to convert the type of variable of an arithmetic program, the program comprising: a profile step that uses as object variables floating-point type variables of an arithmetic program for performing floating-point arithmetic operations, alters the arithmetic program so as to output the changes in the values of the object variables as history at the time of executing the arithmetic program in order to provide a first program, executes the first program and detects the ranges of value of the object variables according to the history obtained as a result of the execution; and a conversion step that alters the arithmetic program according to the ranges of value of the object variables as detected by the profile step so as to convert the object variables into fixed-point type variables in order to provide a second program, executes the second program and determines if the accuracy of the outcome of the execution of the second program meets the predefined and required accuracy level or not.

Preferably, in an arithmetic program conversion program according to the present invention, when the conversion step determines that the accuracy of the outcome of the execution of the second program does not meet the predefined and required accuracy level, it alters the second program so as to expand the predetermined bit widths of the object variables, subsequently executes the second program and determines if the accuracy of the outcome of the execution of the second program meets the predefined and required accuracy level or not.

Preferably, in an arithmetic program conversion program according to the present invention, when the conversion step determines that the accuracy of the outcome of the execution of the second program meets the predefined and required accuracy level, it alters the second program so as to reduce the predetermined bit widths of the object variables, subsequently executes the second program and, when it determines that the accuracy of the outcome of the execution of the second program meets the predefined and required accuracy level, it outputs the second program.

Preferably, in an arithmetic program conversion program according to the present invention, when the conversion step determines that the accuracy of the outcome of the execution of the second program does not meet the predefined and required accuracy level, it alters the second program so as to expand the predetermined bit widths of the object variables, subsequently executes the second program and repeats the expansion of the bit widths of the predetermined object variables, the alteration of the second program and the execution of the second program until the outcome of the execution of the second program meets the predefined and required accuracy level.

Preferably, in an arithmetic program conversion program according to the present invention, the conversion step alters the second program so as to change the predetermined bit widths of the object variables in each stage of an arithmetic unit of the second program, executes the second program and outputs the second program when it determines that the accuracy of the outcome of the execution of the second program meets the predefined and required accuracy level and that the magnitude of the entire operation of the second program is reduced as a result of the change in the bit width.

Preferably, in an arithmetic program conversion program according to the present invention, the profile step executes the first program for each value of parameters that the arithmetic program uses and detects the range of value for each object variable, merging the histories of the values of the parameters.

Preferably, in an arithmetic program conversion program according to the present invention, the conversion step computationally determines the accuracy level according to the outcome of the execution of the first program and the outcome of the execution of the second program.

Preferably, in an arithmetic program conversion program according to the present invention, the profile step executes the first program for each range of value of parameters that the arithmetic program uses and detects the ranges of value of the object variables for each range of value of the parameters and the conversion step alters the arithmetic program so as to add the bit shifts of the object variables according to the ranges of value of the object variables for each range of value of the parameters to the arithmetic program in order to provide the second program.

Preferably, in an arithmetic program conversion program according to the present invention, the profile step specifies the variables of the part to be turned into hardware of the arithmetic program as object variable.

In still another aspect of the present invention, there is provided an arithmetic program conversion method for converting the type of variable of an arithmetic program, the method comprising: a profile step that uses as object variables floating-point type variables of an arithmetic program for performing floating-point arithmetic operations, alters the arithmetic program so as to output the changes in the values of the object variables as history at the time of executing the arithmetic program in order to provide a first program, executes the first program and detects the ranges of value of the object variables according to the history obtained as a result of the execution; and a conversion step that alters the arithmetic program according to the ranges of value of the object variables as detected by the profile step so as to convert the object variables into fixed-point type variables in order to provide a second program, executes the second program and determines if the accuracy of the outcome of the execution of the second program meets the predefined and required accuracy level or not.

Thus, according to the present invention, it is possible to convert a floating-point arithmetic into a fixed-point arithmetic of an arithmetic program, maintaining a desired accuracy level.

BRIEF DESCRIPTION OF THE DRAWINGS

FIG. 7 is a table of profile information of the embodiment of FIG. 1, shown as an example.

DETAILED DESCRIPTION OF THE PREFERRED EMBODIMENTS

Now, a preferred embodiment of the present invention will be described in greater detail by referring to the accompanying drawings.

Firstly, the configuration of an embodiment of arithmetic program conversion apparatus will be described.

Figure 1:
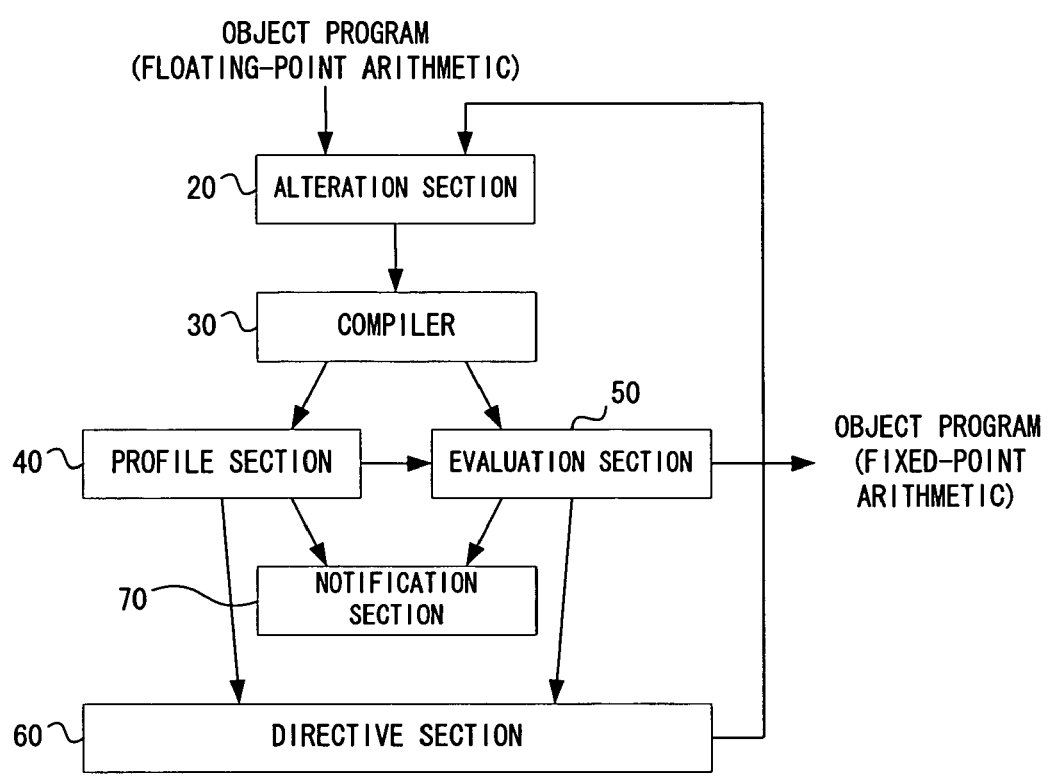
FIG. 1 is a schematic block diagram of an embodiment of arithmetic program conversion apparatus according to the present invention, illustrating the configuration thereof as an example.

FIG. 1 is a schematic block diagram of the embodiment of arithmetic program conversion apparatus according to the present invention, illustrating the configuration thereof as an example. The arithmetic program conversion apparatus comprises an alteration section 20, a compiler 30, a profile section 40, an evaluation section 50, a directive section 60 and a notification section 70. Note that a profile section corresponds to the alteration section 20, the compiler 30, the profile section 40 and the directive section 60 of this embodiment. A conversion section corresponds to the alteration section 20, the compiler 30, the evaluation section 50 and the directive section 60 of this embodiment.

The alteration section 20 receives as input an object program. An object program is a program to be subjected to conversion from a floating-point arithmetic into a fixed-point arithmetic for the purpose of turning part of the program into hardware or for some other purpose. In other words, a floating-point arithmetic algorithm is described in the object program in the initial stages. The evaluation section 50 has a fixed-point library. The fixed-point library has a fixed-point type. The directive section 60 delivers directive information to the alteration section 20 to direct the latter to alter the object program.

The directive information includes variable names, the desired accuracy level, the initial bit widths, the variable bit widths, automatic conversion and a conversion mode. The desired accuracy level is expressed by a lower limit SN ratio. The initial bit widths indicate the lower limit bit widths and the upper limit bit widths of all the variables. The variable bit widths indicate the bit width of each of the variables. Automatic conversion indicates if automatic conversion is to be performed automatically from a floating-point arithmetic to a fixed-point arithmetic or not. A conversion mode may be a mode in which all the variables are subjected to bit width optimization after being collectively converted to fixed-point with a lower limit bit width, a mode in which all the variables are subjected to bit width optimization after being collectively converted to fixed-point with an upper limit bit width or some other mode.

Now, the operation of the arithmetic program conversion apparatus of this embodiment will be described below.

Figure 2:
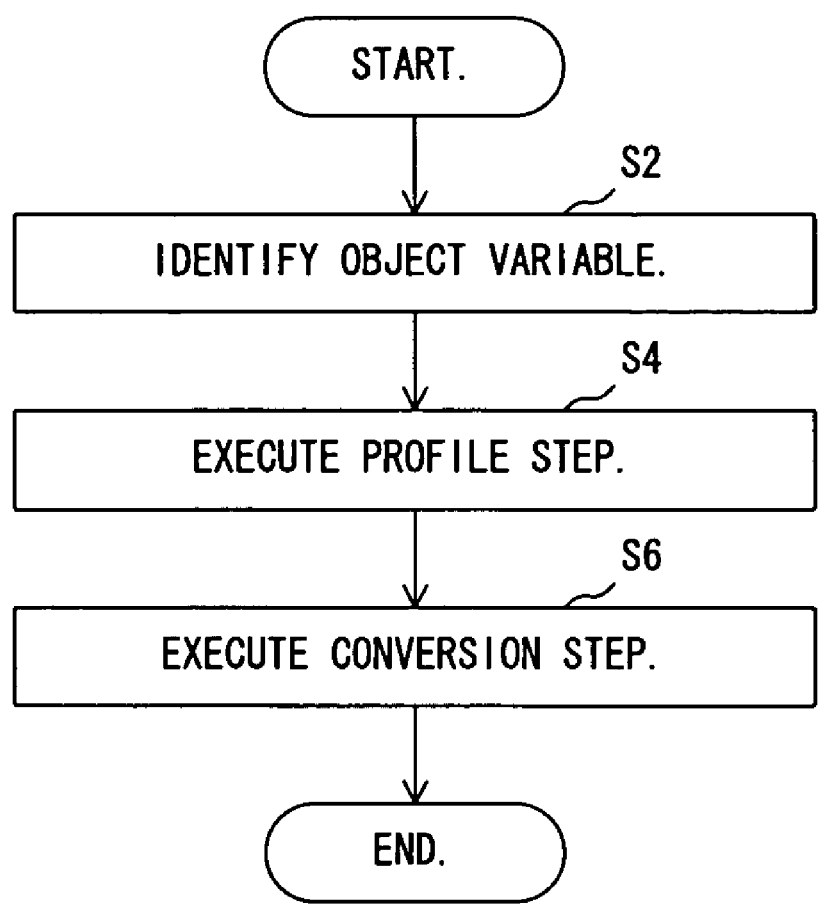
FIG. 2 is a flowchart of the operation of the embodiment of arithmetic program conversion apparatus of FIG. 1, shown as an example.

FIG. 2 is a flowchart of the operation of the arithmetic program conversion apparatus of this embodiment, shown as an example. Referring to FIG. 2, firstly, the directive section 60 identifies the floating-point type variables to be converted into fixed-point type variables as object variables out of the floating-point type variables in the input object program (S2). The variables to be converted into a fixed-point variable are all the variables if the object program is to be entirely turned into hardware, from the variables of the part of the object program that is to be turned into hardware if only that part of the object program is to be turned into hardware or the variables identified by a designer.

Then, the directive section 60 converts the object program into a profile program and executes a profile step for profiling (S4). Subsequently, the directive section 60 executes the first conversion step (conversion step) of converting the floating-point arithmetic of the object program into a fixed-point arithmetic (S6) to end the flow of operation.

Now, the profile step, or the processing step S4, will be described below.

Figure 3:
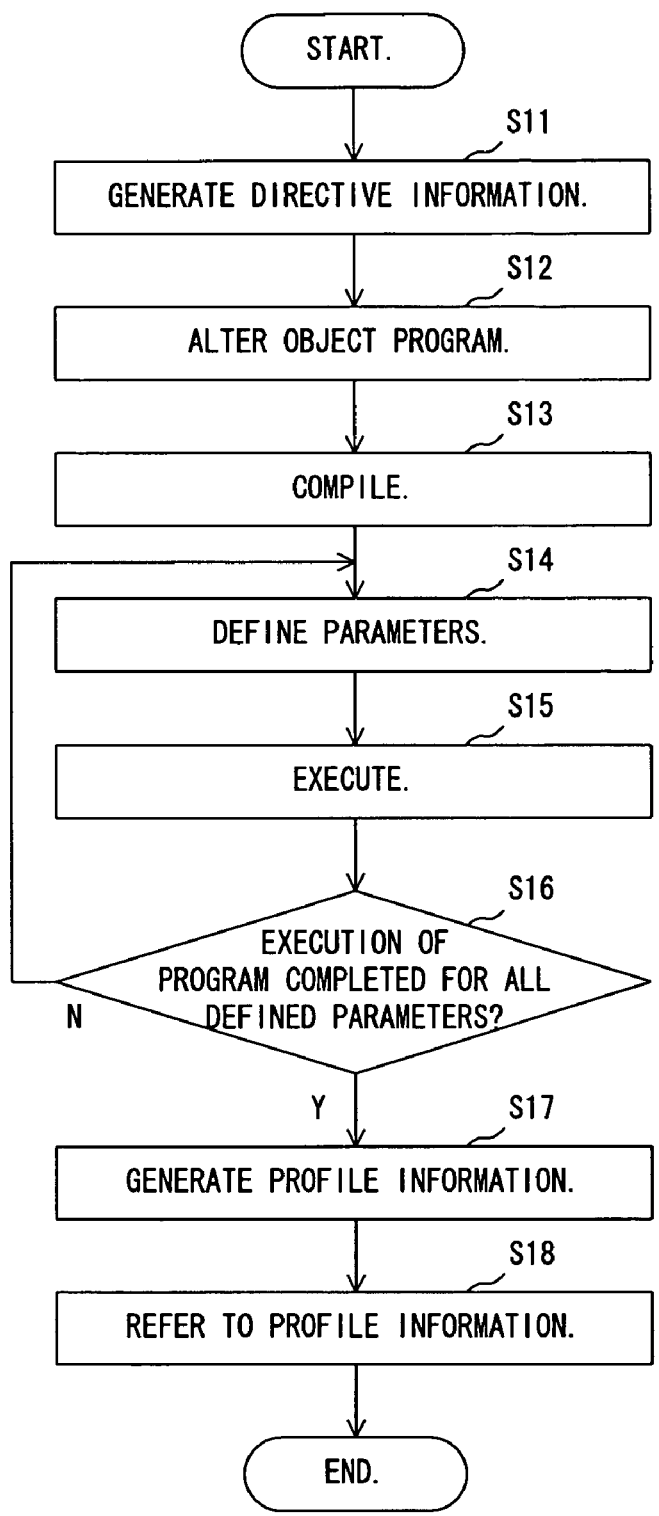
FIG. 3 is a flowchart of the operation of the profile step of the embodiment of FIG. 1, shown as an example.

FIG. 3 is a flowchart of the operation of the profile step of this embodiment, shown as an example. Referring to FIG. 3, firstly, the directive section 60 delivers directive information for rewriting the object program so as to make the object program generate history information at the time of execution to the alteration section 20 (S11). The history information shows the values of the object variables that are to be recorded as the time of updating the values. Then, the alteration section 20 rewrites the object program according to the directive information to provide a profile program (S12).

Thereafter, the compiler 30 compiles the profile program and generates the format of executing the profile program (S13). Then, the profile section 40 defines parameters including the input parameter (test pattern) to the profile program and the mode of execution (S14) and executes the profile program, using the defined parameters, so as to output the outcome of execution and the history information (S15). Thus, the outcome of execution and the history information are output for each of the input parameters. Then, the profile section 40 determines if the execution of the profile program is completed for all the defined parameters or not (S16).

If it is determined that the execution of the program is not completed (S16, N), the processing operation returns to the processing step S14, where the profile section 40 selects the next parameter. If, on the other hand, it is determined that the execution of the program is completed (S16, Y), the profile section 40 generates profile information for each of the object variables from the history information of each of the defined parameters (S17). The profile information is prepared by merging the pieces of history information of the object variables for all the defined parameters and hence indicates the smallest value and the largest value of the object variables and the smallest value and the largest value of the absolute values of the object variables. Then, the profile section 40 performs operations according to the directives of the designer such as displaying and printing history information and profile information by way of the notification section 70 (S18) to end the flow of operation. The profile information may be recorded for each defined parameter.

With the above-described profile step, it is possible to acquire the ranges of value of the object variables in the floating-point arithmetic operations.

Now, the first conversion step of the processing step S6 will be described below.

Figure 4:
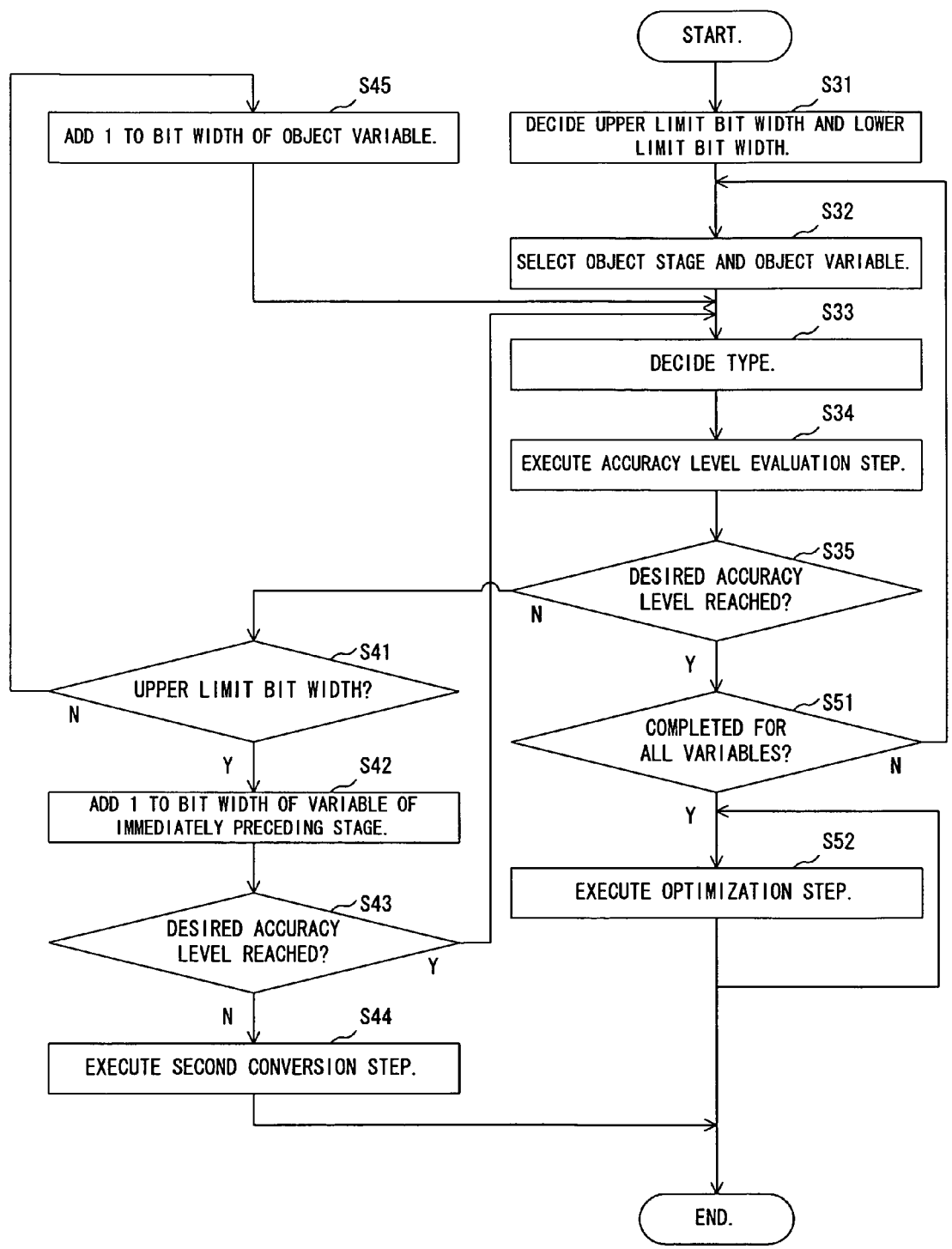
FIG. 4 is a flowchart of the operation of the first conversion step of the embodiment of FIG. 1, shown as an example.

FIG. 4 is a flowchart of the operation of the first conversion step of this embodiment, shown as an example. Referring to FIG. 4, firstly, the desired accuracy level (SN ratio, e.g., 50 dB) is defined in advance. The directive section 60 decides the upper limit bit width and the lower limit bit width from the largest value and the smallest value in the profile information (S31). The upper limit bit width and the lower limit bit width may alternatively be given in advance by the designer.

Then, the directive section 60 selects stages sequentially from the last stage (output stage) of the object program as object stages and selects one of the variables of each of the object stages as object variable (S32). An arithmetic unit in the object program is defined as a stage for the purpose of the present invention. An arithmetic unit is a part that becomes a functional unit when the object program or a part thereof is turned into hardware. Then, the directive section 60 decides the fixed-point type by deciding the bit width of the integer section from the largest value in the profile information and also the position of the fixed-point frame from the smallest value in the profile information and registers it in a bit width list (S33). The bit width of each variable is recorded in the bit width list. Then, the directive section 60 executes an accuracy level evaluation step by delivering the directive information including the fixed-point type to the alteration section 20 (S34). Subsequently, the directive section 60 determines if the accuracy obtained in the accuracy level evaluation step gets to the desired accuracy level or not (S35).

If it is determined in the processing step S35 that the obtained accuracy does not get to the desired accuracy level (S35, No), the directive section 60 determines if the bit width is the upper limit bit width or not (S41). If the bit width is not the upper limit bit width (S41, No), the directive section 60 increments the bit width of the object variable by 1 bit (S45) and returns to the processing step S33. If, on the other hand, the bit width is the upper limit bit width (S41, Yes), the directive section 60 selects the immediately preceding stage as object stage and expands the bit width of the variable of the object stage by 1 bit (S42). If the bit width of the variable of the object stage is the upper limit bit width, the directive section 60 selects the stage immediately preceding the immediately preceding stage as object stage and expands the bit width of the variable of the object stage by 1 bit.

Then, the directive section 60 determines if the bit width can be expanded further or not (S43). If it is determined that the bit width cannot be expanded further (S43, No), the directive section 60 judges that it is not possible to achieve the desired accuracy level by means of this conversion method and executes the second conversion step (S44) to end the flow of operation. If, on the other hand, it is determined that the bit width can be expanded further (S43, Yes), the directive section 60 returns to the processing step S33, where it sequentially processes the remaining object variables of the object stage.

If, on the other hand, it is determined in the processing step S35 that the obtained accuracy gets to the desired accuracy level (S35, Yes), the directive section 60 determines if the conversion to the fixed-point is completed for all the object variables or not (S51). If there is a variable or are variables for which the conversion is not completed (S51, No), the directive section 60 returns to the processing step S32 and selects the next variable to be processed. If, on the other hand, the conversion to the fixed-point is completed for all the object variables (S51, Yes), the directive section 60 executes an optimization step for optimizing the bit width (S52) to end the flow of operation.

Thus, with the above-described first conversion step, it is possible to convert the type of the object variables from the floating-point type to the fixed-point type, while maintaining the desired accuracy level.

Now, the accuracy level evaluation step, or the processing step S34, will be described below.

Figure 5:
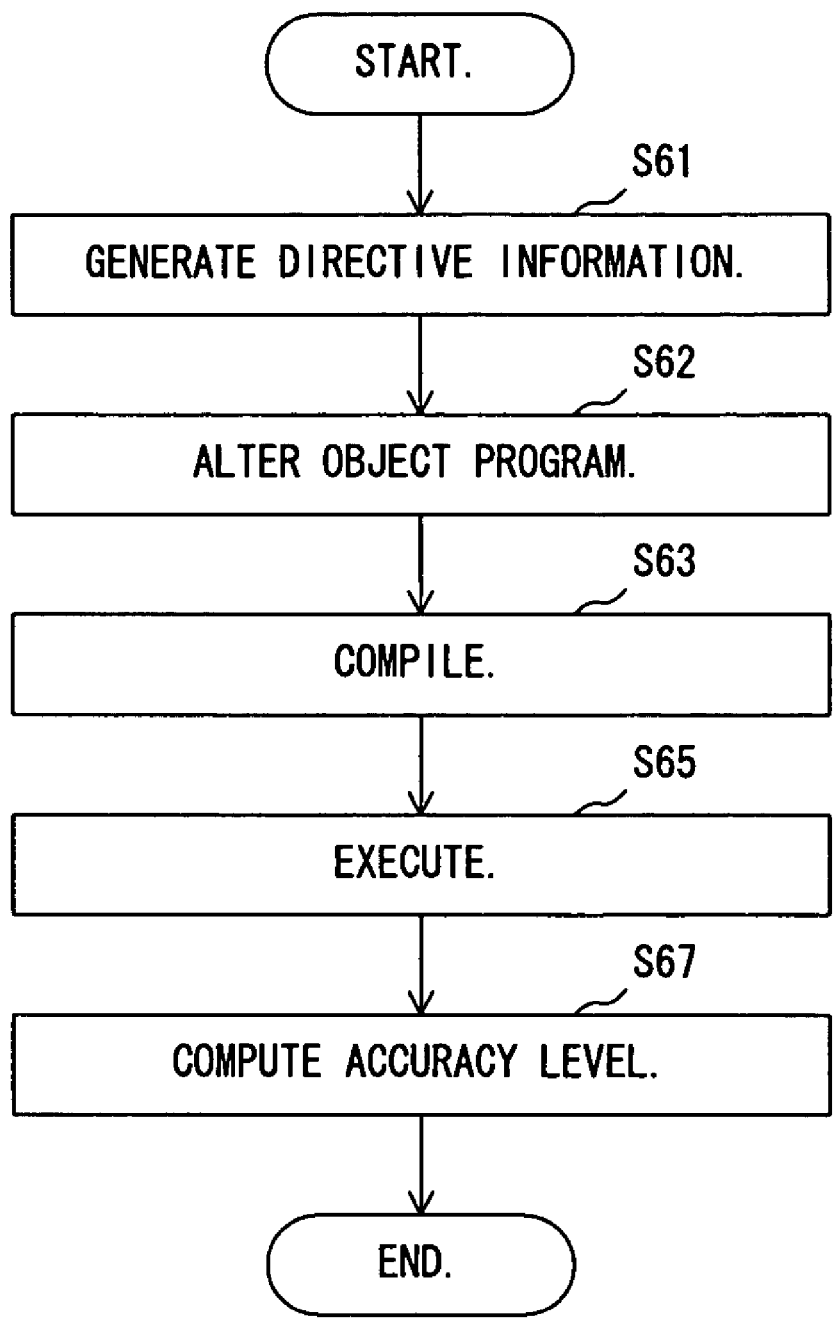
FIG. 5 is a flowchart of the operation of the accuracy evaluation step of the embodiment of FIG. 1, shown as an example.

FIG. 5 is a flowchart of the operation of the accuracy evaluation step of this embodiment, shown as an example. Referring to FIG. 5, firstly, the directive section 60 outputs directive information including the decided fixed-point type to the alteration section 20 (S61). For example, the directive information may give a directive for altering the "double" type in the definition of the object variables to the "fixed16.4" type (the integer section: 16 bits, the decimal section: 4 bits). Then, the alteration section 20 alters the object program according to the directive information (S62). Thereafter, the compiler 30 compiles the object program that has been altered by the alteration section 20 to convert it into an execution format (S63). Subsequently, the evaluation section 50 executes the execution format of the object program and outputs the outcome of the execution (S65).

Then, the evaluation section 50 computationally determines the accuracy (SN ratio) from the outcome of the execution of the floating-point arithmetic obtained as a result of the profile step and the outcome of the execution of the fixed-point arithmetic obtained as a result of the processing step S65 (S67) to end the flow of operation. The accuracy is computationally determined, for example, as error. More specifically, the errors $((B-A)^2)/(A^2)$ are computationally determined, using the outcome A of the execution of the floating-point arithmetic obtained in the profile step and the outcome B of the execution of the fixed-point arithmetic obtained in the processing step S65 and the accuracy is determined as the average of the errors. The accuracy obtained in the accuracy level evaluation step is displayed and/or printed by the notifications section 70.

Thus, with the above-described accuracy level evaluation step, it is possible to decide the bit width for using the desired accuracy level by evaluating the accuracy of the floating-point arithmetic before the conversion and that of the fixed-point arithmetic after the conversion and deciding the superiority of either of them.

Now, the optimization step, or the processing step S52, will be described below.

Figure 6:
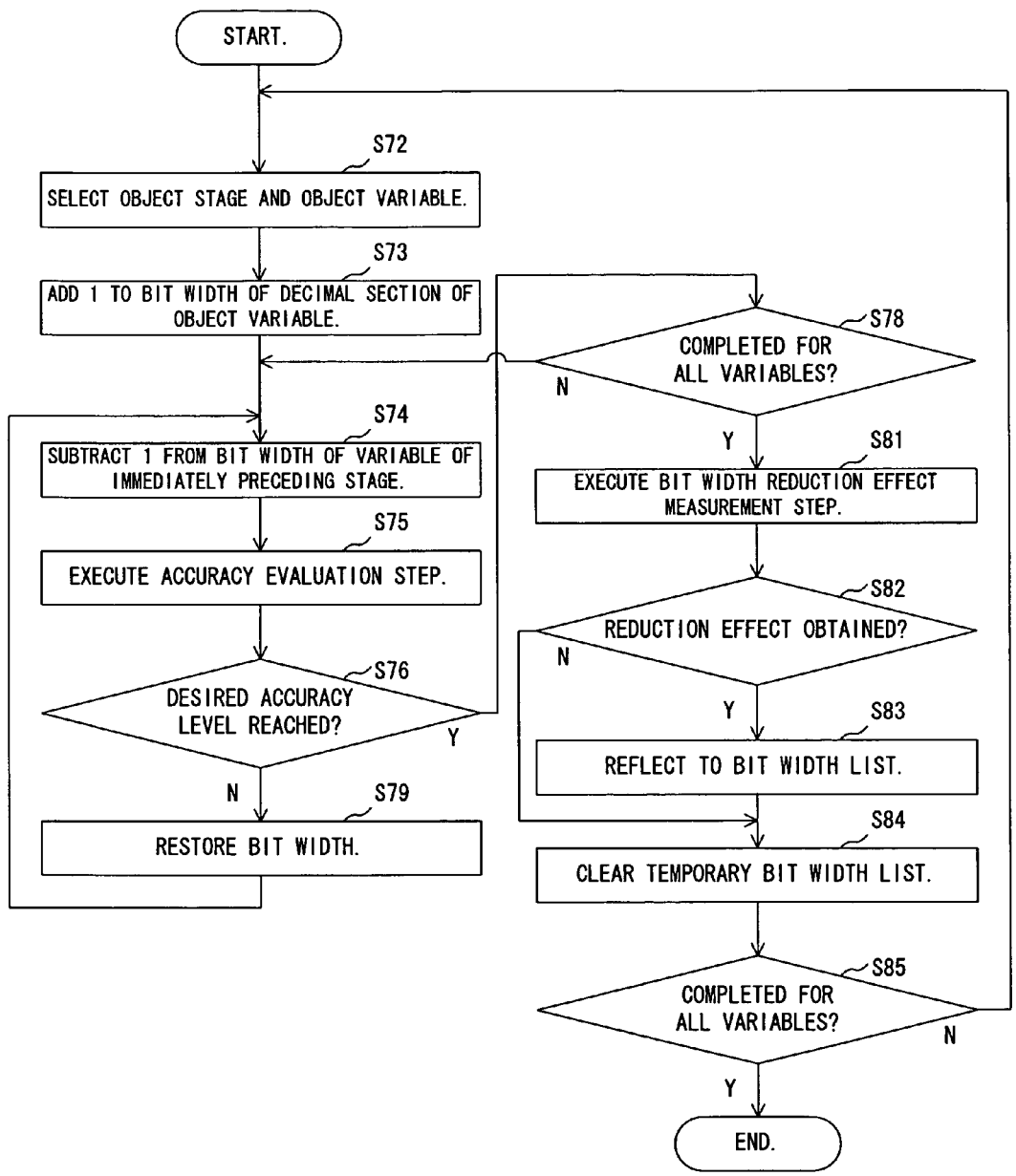
FIG. 6 is a flowchart of the operation of the accuracy evaluation step of the embodiment of FIG. 1, shown as another example.

FIG. 6 is a flowchart of the operation of the accuracy evaluation step of this embodiment, shown as another example. Referring to FIG. 6, firstly, the directive section 60 sequentially selects the stages, starting from the last stage, as object stage and then a variable of the object stage as object variable (S72). Then, the directive section 60 expands the bit width of the decimal section of the object variable in the bit width list by 1 bit and registers it in an incremented/decremented bit width list (S73). The increment/decrement of each variable is recorded in the incremented/decremented bit width list. Thereafter, the directive section 60 decrements the bit width of the immediately preceding variable of the object stage and registers it in the incremented/decremented bit width list (S74). Subsequently, the directive section 60 executes accuracy level evaluation step by delivering the directive information including the bit width of the object variable to the alteration section 20 (S75). Then, the directive section 60 determines if the accuracy obtained in the accuracy level evaluation step gets to the desired accuracy level or not (S76).

If it is determined in the processing step S76 that the obtained accuracy does not get to the desired accuracy level as a result of the evaluation (S76, No), the directive section 60 restores the decremented bit width (expand the bit width by 1 bit) and registers it in the incremented/decremented bit width list (S79) to return to the processing step S74, where it decrements the bit width of the stage immediately preceding the immediately preceding stage. If, on the other hand, it is determined in the processing step S76 that the obtained accuracy gets to the desired accuracy level as a result of the evaluation (S76, Yes), the directive section 60 determines if the accuracy level evaluation step is completed for all the variables or not (S78).

If it is determined that there is a variable or are variable for which the accuracy level evaluation is not completed (S78, No), the directive section 60 returns to the processing step S74, where it decrements the bit width of the stage further preceding the above stage. If, on the other hand, it is determined that the accuracy level evaluation is completed for all the variables (S78, Yes), the directive section 60 executes a bit width reduction effect measurement step (S81) to determine if there is a reduction effect or not (S82).

If it is determined that there is no reduction effect (S82, No), the directive section 60 moves to the processing step S84. If, on the other hand, it is determined that there is a reduction effect (S82, Yes), the directive section 60 reflects the contents of the temporary variable bit width list to the variable bit width list (S83). Then, the directive section 60 clears the temporary variable bit width list (S84). Thereafter, the directive section 60 determines if the bit width reduction effect measurement step is completed for all the variables or not (S85). If it is determined that the bit width reduction effect measurement step is not completed for all the variables (S85, No), the directive section 60 returns to the processing step S72 and selects the next object variable and the next object stage. If, on the other hand, it is determined that the bit width reduction effect measurement step is completed for all the variables (S85, Yes), the directive section 60 ends the flow of operation.

Now, the bit width reduction effect measurement step, or the processing step S81, will be described below.

The directive section 60 refers to the incremented/decremented bit width list for each variable and, if (the decremented bit width−expanded bit width)>0, it judges that there is a reduction effect. While the values of the bit width list and those of the incremented/decremented bit width list are recorded for each variable in the above description of the embodiment, they may be recorded for each variable and each functional unit. If such is the case, the directive section 60 prepares a data flow graph or the like to add the bits of the functional unit and judges that there is a reduction effect when the sum of the addition of bits is reduced. It is possible to realize a more accurate optimization by computationally determining the bit widths for each function unit. Alternatively, the different types of functional unit may be compared in terms of the dimension of the circuit obtained by turning the program or a part thereof into hardware. For example, if the number of bits that is reduced by an adder is equal to the number of bits that is reduced by an multiplier, it is judged that the multiplier provides a greater bit number reduction effect than the adder in terms of circuit dimension.

Thus, with the above-described optimization step, it is possible to prevent the bit widths from being unnecessarily expanded and optimize the bit widths by incrementing/decrementing the bit width of each variable, while checking the increases/decreases of the bit widths of the entire object program.

Now, the second conversion step, or the processing step S44, will be described below.

The second conversion step is a process to be executed when it is judged that the first conversion step cannot achieve the desired accuracy level. While the operation of the second conversion step is same as that of the first conversion step, the object program is altered so as to temporarily secure a dynamic range in the accuracy level evaluation step, or the processing steps S61, S62. More specifically, the directive section 60 selects object variables with different ranges of value by defining parameters (including modes of execution and input parameters) on the basis of the history information or the profile information for the second conversion step. Additionally, the directive section 60 determines the object part for which the range of value is changed typically on the basis of the branch due to the mode and the input parameter. Alternatively, the directive section 60 may determine the object part according to the directives of the designer. The directive section 60 rewrites object program so as to move the decimal point by a predetermined fixed value at the starting point of the object part and returns the decimal point to the original position at the ending point of the object part.

Now, the second conversion step will be described below by way of a specific example.

Firstly, an object program before the conversion in the second conversion step is shown below.

```
X [n] = p1 * D [n] ;
Y = ΣX [n] :
```

Assume here that the range of value of the object variable x [n] varies remarkable depending on the parameter p1. FIG. 7 is a table of profile information of this embodiment, shown as an example. The range of value (the largest value and the smallest value) of the object variable X [n] is shown for each value of the input parameter p1 in the profile information. It is determined that the integer section of X[n] requires 1 bit when p1=1, the integer section of X[n] requires 3 bits when p1=5 and the integer section of X[n] requires 4 bits when p1=10, whereas the integer section of X[n] requires 4 bits when p1=15 and the integer section of X[n] requires 5 bits when p1=20. It will be appreciated that the integer section of x [n] has 5 bits and the decimal section of x [n] has 3 bits to make the total equal to 8 bits according to the first conversion step. Therefore, 4 bits of the integer section are wasted when p1=1.

In the second conversion step, the directive section 60 adds the classification by the ranges of value of the input parameters to the object program and also the bit shift of the object variable for each input parameter.

The object program (C program) converted in the second conversion step is shown below.

```
switch (p1) {
shift X [n] for 8 bits by //p1
case 1 : X [n] = (p1 * D [n]) << 4;
case 5 : X [n] = (p1 * D [n]) << 2;
case 10 : X [n] = (p1 * D [n]) << 1;
case 15 : X [n] = (p1 * D [n]) << 1;
case 20 : X [n] = (p1 * D [n]) ;
}
Y = ΣX [n]
switch (p1) {
case 1 : Y = Y >> 4;
case 5 : Y = Y >> 2;
case 10 : Y = Y >> 1;
case 15 : Y = Y >> 1;
case 20 : Y = Y ;
}
```

Thus, with the above-described second conversion step, it is possible to secure a dynamic range with small bit widths by temporarily performing a bit shift for each input parameter (mode).

While the second conversion step is used when the first conversion step does not provide a desired accuracy level in the above description of the embodiment, it may alternatively be so arranged that either the first conversion step or the second conversion step is selected depending on the object program.

Thus, with this embodiment of the present invention, it is possible to automatically convert a floating-point arithmetic program into a fixed-point arithmetic program to be installed in hardware/firmware. Additionally, it is possible with the fixed-point arithmetic program obtained by conversion to prevent bit widths from expanding, while securing the desired accuracy level.

This embodiment of arithmetic program conversion apparatus can be applied to information processing apparatus without difficulty to improve the performance of information processing apparatus. Such information processing apparatus include PCs (personal computers), network servers and work stations.

Additionally, it is possible to provide an arithmetic program conversion program for causing the computer operating as a component of an arithmetic program conversion apparatus according to the present invention to execute the above-described steps. Such a program can be executed by the computer operating as a component of an arithmetic program conversion apparatus when the program is stored in a computer readable recording medium. Computer readable recording mediums that can be used for the purpose of the present invention include internal storage apparatus such as ROMs and RAMs mounted in computers, portable type storage mediums such as CD-ROMs, flexible disks, DVD disks, magneto-optical disks and IC cards, databases external computers, databases of such computers and transmission mediums on communication lines.

What is claimed is:

1. An arithmetic program conversion apparatus for converting a floating-point arithmetic operation in an arithmetic program into a fixed-point arithmetic operation, the apparatus comprising:
   a storage;
   a processor;
   a profile section that, when executed by the processor:
      specifies a variable of a floating-point type in the arithmetic program, defines values of an input parameter in the arithmetic program, wherein the specified variable is an arithmetic result that depends on the value of the input parameter,
      generates a first program from the arithmetic program, wherein the first program causes the processor to record a history of values of the specified variable in the storage during execution of the first program,
      executes the first program for each of the defined values of the input parameter and records a plurality of corresponding histories for the specified variable in the storage, and
      detects a range of values of the specified variable from the histories; and
   a conversion section that, when executed by the processor:
      generates a second program from the arithmetic program,
      executes the second program, and
      determines if accuracy of an outcome of the executing of the second program meets a predefined accuracy level,
   wherein in the generating of the second program, the conversion section:
      selects from the arithmetic program an arithmetic operation, wherein the output from the arithmetic operation depends on the input parameter and the specified variable,
      converts the specified variable into a variable of a fixed-point type based on the detected range,
      adds to the arithmetic operation a classification operation which classifies a value of the input parameter and selects a shift amount from a plurality of shift amounts according to the classified value,
      adds to the arithmetic operation a first bit shift operation which moves from a original position a decimal point of the specified variable by shifting according to the selected shift amount, and
      adds to the arithmetic operation a second bit shift operation which returns to the original position the decimal point of the output from the selected arithmetic operation by shifting in the opposite direction according to the selected shift amount.

2. The apparatus according to claim 1, wherein, when the conversion section determines that the accuracy of the outcome of the executing of the second program does not meet the predefined accuracy level, the conversion section alters the second program so as to expand a bit width of the converted variable, subsequently executes the second program with the expanded bit width, and determines if accuracy of an outcome of the executing of the second program with the expanded bit width meets the predefined accuracy level.

3. The apparatus according to claim 2, wherein, when the conversion section determines that the accuracy of the outcome of the executing of the second program meets the predefined accuracy level, the conversion section alters the second program so as to reduce the bit width of the converted variable, subsequently executes the second program with the reduced bit width, and, when it determines that accuracy of an outcome of the executing of the second program with the reduced bit width meets the predefined accuracy level, the conversion section outputs the second program with the reduced bit width.

4. The apparatus according to claim 1, wherein, when the conversion section determines that the accuracy of the outcome of the executing of the second program does not meet the predefined accuracy level, the conversion section alters the second program so as to expand a bit width of the converted variable, subsequently executes the altered second program, and repeats the expansion of the bit width, the alteration of the second program, and the executing of the altered second program, until the outcome of the executing of the altered second program meets the predefined accuracy level.

5. The apparatus according to claim 1, wherein the conversion section alters the second program so as to change a bit width of the converted variable in each stage of an arithmetic unit in the second program, executes the altered second program, and outputs the altered second program when it determines that the accuracy of the outcome of the executing of the altered second program meets the predefined accuracy level and that magnitude of an entire operation of the altered second program is reduced as a result of the change in the bit width.

6. The apparatus according to claim 1, wherein the profile section executes the first program for each of the defined values of the parameter and detects the detected range by merging the histories.

7. The apparatus according to claim 1, wherein the conversion section computationally determines the accuracy according to an outcome of the executing of the first program and the outcome of the executing of the second program.

8. The apparatus according to claim 1, wherein the profile section specifies a variable of a part to be turned into hardware of the arithmetic program as the specified variable.

9. A non-transitory computer-readable medium storing an arithmetic program conversion program causing a computer to execute a process for converting a floating-point arithmetic operation in an arithmetic program into a fixed-point arithmetic operation, the process comprising:
   specifying a variable of a floating-point type in the arithmetic program;

defining values of an input parameter in the arithmetic program, wherein the specified variable is an arithmetic result that depends on the value of the input parameter;

generating a first program from the arithmetic program, wherein the first program causes the computer to record a history of values of the specified variable in a storage during execution of the first program;

executing the first program for each of the defined values of the input parameter and to record a plurality of corresponding histories for the specified variable in the storage;

detecting a range of values of the specified variable from the histories;

generating a second program from the arithmetic program;

executing the second program; and determining if accuracy of an outcome of the executing of the second program meets a predefined accuracy level, wherein the generating of the second program includes:

selecting from the arithmetic program an arithmetic operation, wherein the output from the arithmetic operation depends on the input parameter and the specified variable;

converting the specified variable into a variable of a fixed-point type based on the detected range;

adding to the arithmetic operation a classification operation which classifies a value of the input parameter and selects a shift amount from a plurality of shift amounts according to the classified value;

adding to the arithmetic operation a first bit shift operation which moves from a original position a decimal point of the specified variable by shifting according to the selected shift amount; and adding to the arithmetic operation a second bit shift operation which returns to the original position the decimal point of the output from the selected arithmetic operation by shifting in the opposite direction according to the selected shift amount.

10. The program according to claim 9, wherein, when the determining determines that the accuracy of the outcome of the executing of the second program does not meet the predefined accuracy level, it the determining alters the second program so as to expand a bit width of the converted variable, subsequently executes the second program with the expanded bit width, and determines if accuracy of an outcome of the executing of the second program with the expanded bit width meets the predefined accuracy level.

11. The program according to claim 9, wherein, when the determining determines that the accuracy of the outcome of the executing of the second program meets the predefined accuracy level, the determining alters the second program so as to reduce the bit width of the converted variable, subsequently executes the second program with the reduced bit width, and, when it determines that accuracy of an outcome of the executing of the second program with the reduced bit width meets the predefined accuracy level, the determining outputs the second program with the reduced bit width.

12. The program according to claim 9, wherein, when the determining determines that the accuracy of the outcome of the executing of the second program does not meet the predefined accuracy level, the determining alters the second program so as to expand a bit width of the converted variable, subsequently executes the altered second program, and repeats the expansion of the bit width, the alteration of the second program, and the executing of the altered second program, until the outcome of the executing of the altered second program meets the predefined accuracy level.

13. The program according to claim 9, wherein the determining alters the second program so as to change a bit width of the converted variable in each stage of an arithmetic unit in the second program, executes the altered second program, and outputs the altered second program when it determines that the accuracy of the outcome of the executing of the altered second program meets the predefined accuracy level and that magnitude of an entire operation of the altered second program is reduced as a result of the change in the bit width.

14. The program according to claim 9, wherein the executing of the first program executes the first program for each of the defined values of the parameter and detects the detected range by merging the histories.

15. The program according to claim 9, wherein the determining computationally determines the accuracy according to an outcome of the executing of the first program and the outcome of the executing of the second program.

16. The program according to claim 9, wherein the specifying specifies a variable of a part to be turned into hardware of the arithmetic program as the specified variable.

17. An arithmetic program conversion method for converting a floating-point arithmetic operation in an arithmetic program into a fixed-point arithmetic operation, the method comprising using a computer comprising a processor and a storage to execute a process including:

specifying a variable of a floating-point type in the arithmetic program;

defining values of an input parameter in the arithmetic program, wherein the specified variable is an arithmetic result that depends on the value of the input parameter;

generating, by the processor, a first program from the arithmetic program, wherein the first program causes the processor to record a history of values of the specified variable in the storage during execution of the first program;

executing the first program for each of the defined values of the input parameter and to record a plurality of corresponding histories for the specified variable in the storage;

detecting a range of values of the specified variable from the histories;

generating, by the processor, a second program from the arithmetic program;

executing the second program; and determining, by the processor, if accuracy of an outcome of the executing of the second program meets a predefined accuracy level, wherein the generating of the second program includes:

selecting from the arithmetic program an arithmetic operation, wherein the output from the arithmetic operation depends on the input parameter and the specified variable;

converting the specified variable into a variable of a fixed-point type based on the detected range;

adding to the arithmetic operation a classification operation which classifies a value of the input parameter and selects a shift amount from a plurality of shift amounts according to the classified value;

adding to the arithmetic operation a first bit shift operation which moves from a original position a decimal point of the specified variable by shifting according to the selected shift amount; and adding to the arithmetic operation a second bit shift operation which returns to the original position the decimal point of the output from the selected arithmetic operation by shifting in the opposite direction according to the selected shift amount.

18. The method according to claim 17, wherein,
when the determining determines that the accuracy of the outcome of the executing of the second program does not meet the predefined accuracy level, the determining alters the second program so as to expand a bit width of the converted variable, subsequently executes the second program with the expanded bit width, and determines if accuracy of an outcome of the executing of the second program with the expanded bit width meets the predefined accuracy level.

\* \* \* \* \*